United States Patent
Haikin et al.

(10) Patent No.: US 7,154,636 B2
(45) Date of Patent: Dec. 26, 2006

(54) COLOR APPEARANCE SPACE TO CMYK MAPPING USING RELATIVE PURITY

(75) Inventors: John S. Haikin, Fremont, CA (US);
Todd D. Newman, Palo Alto, CA (US);
Sharon A. Henley, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 10/953,705

(22) Filed: Sep. 28, 2004

(65) Prior Publication Data

US 2006/0072131 A1   Apr. 6, 2006

(51) Int. Cl.
*G06K 15/00* (2006.01)
*H04N 1/46* (2006.01)

(52) U.S. Cl. .................. 358/1.9; 358/2.1; 358/518

(58) Field of Classification Search ............ 358/1.9, 358/2.1, 500, 512, 517, 518, 520
See application file for complete search history.

(56) References Cited

U.S. PATENT DOCUMENTS

| | | | |
|---|---|---|---|
| 5,481,655 A | 1/1996 | Jacobs | 358/1.9 |
| 5,966,474 A * | 10/1999 | Vondran, Jr. | 382/300 |
| 6,005,968 A | 12/1999 | Granger | 382/162 |
| 6,028,683 A * | 2/2000 | Vondran, Jr. | 358/525 |
| 6,335,800 B1 | 1/2002 | Balasubramanian | 358/1.9 |
| 6,704,442 B1 | 3/2004 | Haikin et al. | 382/162 |
| 7,019,868 B1 | 3/2006 | Chang et al. | 358/2.1 |
| 2002/0159081 A1 | 10/2002 | Zeng | |
| 2003/0072016 A1 * | 4/2003 | Dalrymple et al. | 358/1.9 |
| 2005/0047654 A1 * | 3/2005 | Newman et al. | 382/167 |
| 2005/0123971 A1 * | 6/2005 | Di et al. | 435/6 |

FOREIGN PATENT DOCUMENTS

EP        0446060 A1  *  11/1991

OTHER PUBLICATIONS

U.S. Appl. No. 10/740,395 (Altenhof-Long et al.), pending.
U.S. Appl. No. 10/841,184 (John S. Haikin), pending.

* cited by examiner

*Primary Examiner*—Jerome Grant, II
(74) *Attorney, Agent, or Firm*—Fitzpatrick, Cella, Harper & Scinto (57) ABSTRACT

The present invention relates to a color management method for the conversion of internal color appearance space color values to CMYK device values, by interpolating CMY values from a plurality of CMY to color appearance space lookup tables, wherein each CMY table is associated with a specific value of K. A target internal color value is received and the relative purity of that color is calculated in the CMY space. Next, a black generation value is calculated using the relative purity of the target color. Finally, one of the plurality of CMY lookup tables is selected based on the black generation value, and a CMYK value is provided based on an interpolation from the selected lookup table. In this way, the present invention is able to control the output K value in a color appearance space to CMYK conversion. Accordingly, colors across a wide relative purity range, including natural images, can be reproduced with better accuracy and higher quality.

16 Claims, 5 Drawing Sheets

COLOR APPEARANCE SPACE TO CMYK MAPPING USING RELATIVE PURITY

BACKGROUND OF THE INVENTION

1. Field of the Invention

The present invention relates to a color management method for the conversion of internal color appearance space to color values in CMYK device space.

2. Description of the Related Art

Typically, color management systems utilize color transforms to convert colors from device-dependent to device-independent color spaces, and vice versa. This is beneficial because different devices display colors in different ways. For example, when one type of RGB monitor displays the color R=100, G=0, B=0, the measured output of that monitor may be different from the measured output of another type of RGB monitor that is displaying the same RGB value. Therefore, the two monitors cannot use the same RGB device values if display of the same color is desired. Instead, conversions are applied between device-dependent RGB values and a device-independent color appearance space so that colors can be accurately mapped and reproduced between different devices.

This mapping is typically achieved with color transforms. Conventionally, color transforms are created by measuring the output of a specific device at a plurality of known inputs. For example, a color transform for a CMYK printer can be computed by measuring color patches printed by the printer at a plurality of CMYK values. The measurements are taken by a color measuring device, such as a calorimeter or a spectrophotometer, and the measurements are in a device-independent color space, such as CIEXYZ, CIELab, CIECAM, or CIELuv. With these measurements, a color management system is able to easily predict what device-independent color a printer will produce at a specific value of CMYK.

However, color management systems ordinarily rely on a conversion in the reverse direction, from device-independent color values to CMYK device-dependent values, and this conversion is not as straightforward. As with other color spaces having four or more color components, the CMYK space is overspecified. In other words, the same color can theoretically be produced using different amounts of black ink (K) with varying amounts of cyan, magenta, and yellow (CMY). Therefore, a one to one conversion from color appearance space to CMYK space is not mathematically possible. This leads to potentially unsatisfactory conversions, since certain levels of black ink may produce visually unsatisfactory colors. For instance, neutral colors, such as grays, typically look better with higher amounts of black ink, even though mathematically accurate conversions can be found with low amounts of black ink. On the other hand, saturated non-neutral colors appear sharper with lower amounts of black ink.

Attempts have been made to control the K level in CMYK to CMYK device conversions. However, these attempts have failed to address the problems associated with controlling the K level in a color appearance space to CMYK space conversion. Other attempts have been made to treat the conversion of neutral and non-neutral color appearance space values differently, but have generally been unsatisfactory.

U.S. patent application Ser. No. 10/841,184, filed on May 6, 2004, presents a method for controlling the K value in internal color space to CMYK conversions. While the method described in that application performs well for computer-generated graphic images, improved control over the K channel is needed for natural images that include more continuous colors.

SUMMARY OF THE INVENTION

To address the foregoing, the present invention calculates relative CMY purity of a target internal color value, from which an associated black generation value of the target internal color value is calculated. A K value is selected based on the black generation value, and CMY values are thereafter obtained based on the selected K value and the target value.

Thus, according to one aspect of the invention, a target internal color value is received and a relative purity of that value is calculated in CMY space. A black generation value is then calculated from the relative purity. Based on the black generation value, a plurality of CMY lookup tables is consulted, wherein each of the CMY lookup tables maps from CMY space to internal color space (such as Lab) for a fixed value of K. One of the plurality of CMY lookup tables is selected based on the black generation value. Finally, a CMYK value is provided based on interpolation from the selected lookup table.

By calculating the relative purity and a corresponding black generation value of the target internal color, and selecting a CMY lookup table based on the black generation value, the present invention controls the output K value in a conversion from color appearance space to CMYK. In this way, colors across a broad relative purity range, including natural images, can be reproduced with better accuracy and higher quality.

According to another aspect of the present invention, the relative purity of the target internal color value is calculated from a corresponding CMY value from a selected one of the plural CMY lookup tables, the selected CMY lookup table being that one of the plurality of lookup tables with the smallest K value that also contains the target internal color value. This value is calculated by subtracting the smallest value of C, M or Y corresponding to the target internal color value from the largest value of C, M, or Y corresponding to the target internal color value, and dividing that total by the largest value of C, M, or Y corresponding to the target internal color value.

According to still another aspect of the invention, the black generation value is determined to be zero if the calculated relative purity is greater than a predetermined black generation threshold. If the relative purity is less than or equal to the predetermined black generation threshold, the black generation value is determined by the equation:

$$BlackGenerationValue = (1 - relativepurity)^{gamma}$$

The CMY lookup table associated with the K value percentage that is closest to the calculated black generation value is then selected for the conversion.

According to yet another aspect of the invention, the target internal color value is converted to a CMYK color value by first interpolating a CMY value from the selected lookup table and the target internal color value. Next an error in the interpolated CMY value is computed and compared to a predetermined error threshold. If the predetermined error threshold is met, the interpolated CMY value and the K value associated with the selected CMY lookup table is provided as the converted CMYK value. If the predetermined error threshold is not met, the interpolation process is repeated until the error threshold is met or until a predetermined maximum number of iterations is reached.

According to another aspect of the invention, the interpolation is achieved using Newton's method and Jacobians.

This brief summary has been provided so that the nature of the invention may be understood quickly. A more complete understanding of the invention can be obtained by reference to the following detailed description of one embodiment thereof in connection with the attached drawings.

DETAILED DESCRIPTION

The present invention provides a color management system for converting color appearance space values to CMYK values, wherein control is maintained over the K channel.

The color management system of the present invention is implemented in a computing environment, such as in a color management module (CMM) contained in a device driver or computer operating system. The color management system is typically arranged as executable code stored and a computer-readable memory medium. A CMM utilizes this code to perform color conversion from an internal color appearance space to CMYK space for rendering to a CMYK device, such as a CMYK printer.

Figure 1:
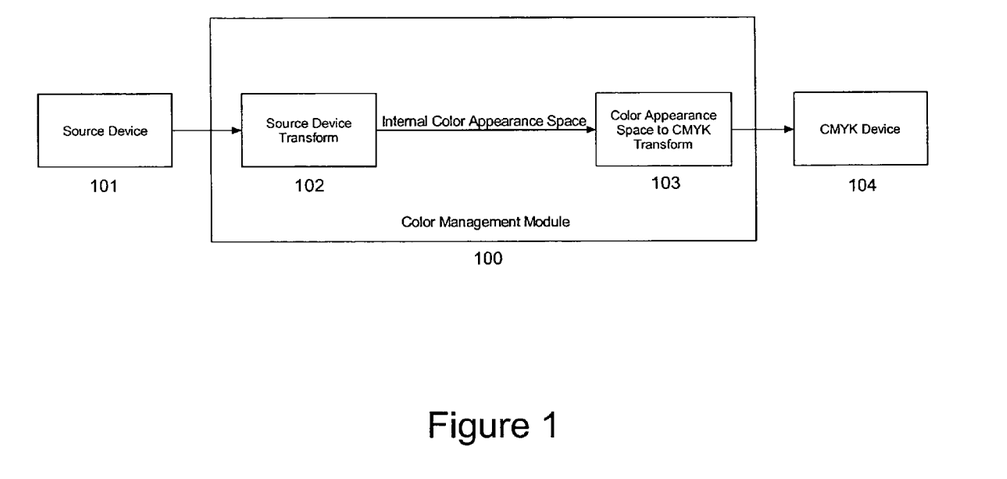
FIG. 1 is a block diagram depicting a color management system.

FIG. 1 depicts a conventional color management system in which the destination device is a CMYK device. CMM 100 utilizes source device transform 102 to convert device-dependent color values output by source device 101 into an internal color appearance space. The color appearance space can be implemented in many different formats, including CIELab, CIECAM, and CIELuv. CMM 100 also typically performs color processing operations, such as gamut mapping, on the color data in the color appearance space. CMM 100 uses color appearance space to CMYK transform 103 to convert color appearance space values into CMYK values that can be used by CMYK device 104.

The present invention concerns the conversion from a color appearance space to CMYK space, and particularly concerns a conversion that maintains control over the K (black ink) channel based on color purity. Maintaining control over the K channel in this conversion is beneficial because neutral colors, such as grays, typically look better with higher amounts of black ink, and saturated non-neutral colors (i.e., colors with high color purity) appear sharper with lower amounts of black ink. In addition, maintaining control over the K channel is beneficial for natural images with more continuous colors, since it largely avoids abrupt changes in the amount of K used in slowly changing colors. Rather, changes in the amount of K are more gradual over slowly changing colors, resulting in enhanced impressions of tonality as compared with a "banded" result that might otherwise be obtained if the amount of K changed more abruptly.

Since the CMYK color space is overspecified, i.e., different amounts of black ink (K) can be used with varying amounts of cyan, magenta, and yellow (CMY) to produce the same or similar color, more than one definition exists when converting from color appearance space to CMYK space. Simply put, a 4 to 3 CMYK to color appearance space transform cannot be one-for-one inverted to produce a unique reverse transform.

Figure 2:
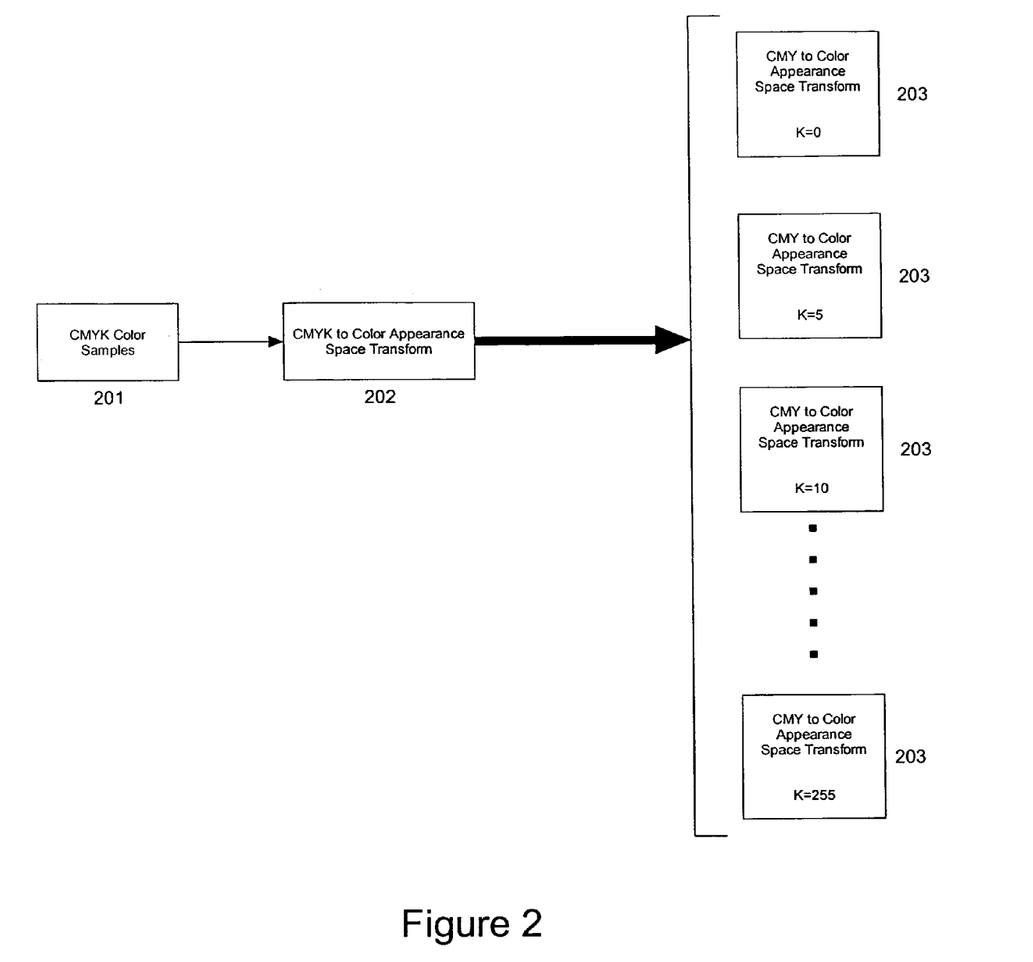
FIG. 2 is a block diagram depicting the creation of plural K-based CMY lookup tables.

In one embodiment of the invention, the first step in converting an internal color space value to a CMYK value is the creation of a plurality of three-dimensional (3-D) CMY to color appearance space lookup tables (LUT). Each 3-D LUT is keyed to a constant value of K. FIG. 2 depicts one method of creating the LUTs. CMYK color samples 201 are supplied to CMYK to color appearance space transform 202. Transform 202 is the forward (i.e., CMYK to color appearance space) transform associated with the device for which the color appearance space to CMYK conversion is desired. In effect, running CMYK color samples through transform 202 creates 'pseudo color measurements' for the associated CMYK device.

These pseudo-measurements are then placed in the LUT corresponding to the K value of the sample, so as to create plural CMY LUTs 203. With the K value constant, each entry in the LUTs maps a color defined by its CMY color components to a color in color appearance space. In this embodiment, 52 LUTs are created, where the K value of the LUTs range in decimal values of K=0 to K=255 in steps of 5. More or fewer tables could be used, depending on the desired degree of control over the K channel. Along with the associated K value, each LUT also stores the smallest and largest lightness value of the color appearance space values contained therein. For instance, for a CIECAM (Jab) color appearance space, the smallest and largest J value is stored. For a CIELab color appearance space, the smallest and largest L values would be stored.

The method for creating the 52 CMY to color appearance space LUTs depicted by FIG. 2 may be unnecessary if actual color measurements for the desired CMYK device are available. Such actual measurements could simply be grouped into different LUTs based on K value. Again, the smallest and largest lightness value contained in each LUT would also be stored.

Once created, the LUTs can be stored on a fixed disk for future use. Also, the LUTs can be recreated each time they are needed in order to conserve disk space. Of course, there are many acceptable ways of arranging and accessing the LUTs in a storage medium.

Figure 3:
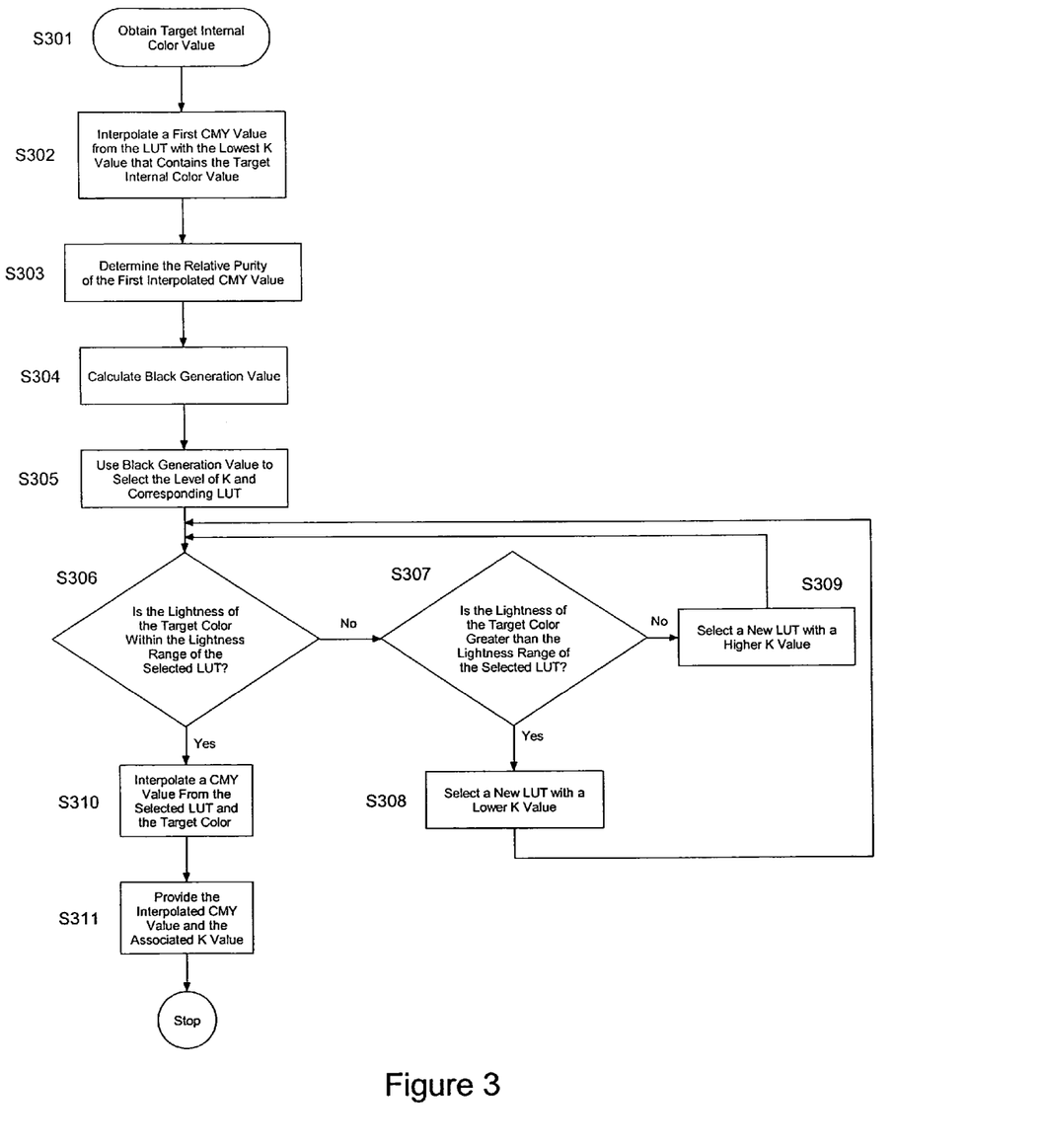
FIG. 3 is a flowchart depicting a process for the conversion of a color appearance space value to a CMYK value.

The three-dimensional CMY to color appearance space LUTs can be inverted to generate the desired conversion. FIG. 3 shows a flowchart depicting this process. The flow sequence shown in FIG. 3 is stored as executable code on a computer-readable memory medium, which is executed by a processor to effect the sequence shown in the figure. Briefly, these steps effect a conversion by first receiving a target internal color value to be converted and then calculating a relative purity of the target internal color value in CMY space. A black generation value is then calculated from the relative purity. Next, one of the plurality of CMY lookup tables is selected based on the black generation value. Finally, a CMYK value is provided based on interpolation from the selected lookup table.

Thus, in S301, a target color appearance space value is obtained (target internal color value). This target internal color value represents a color appearance space value to be converted to CMYK. For instance, the target internal color value could represent one pixel of an image file after conversion by source device transform 102 (FIG. 1) and other processing such as gamut mapping by CMM 100.

Figure 4:
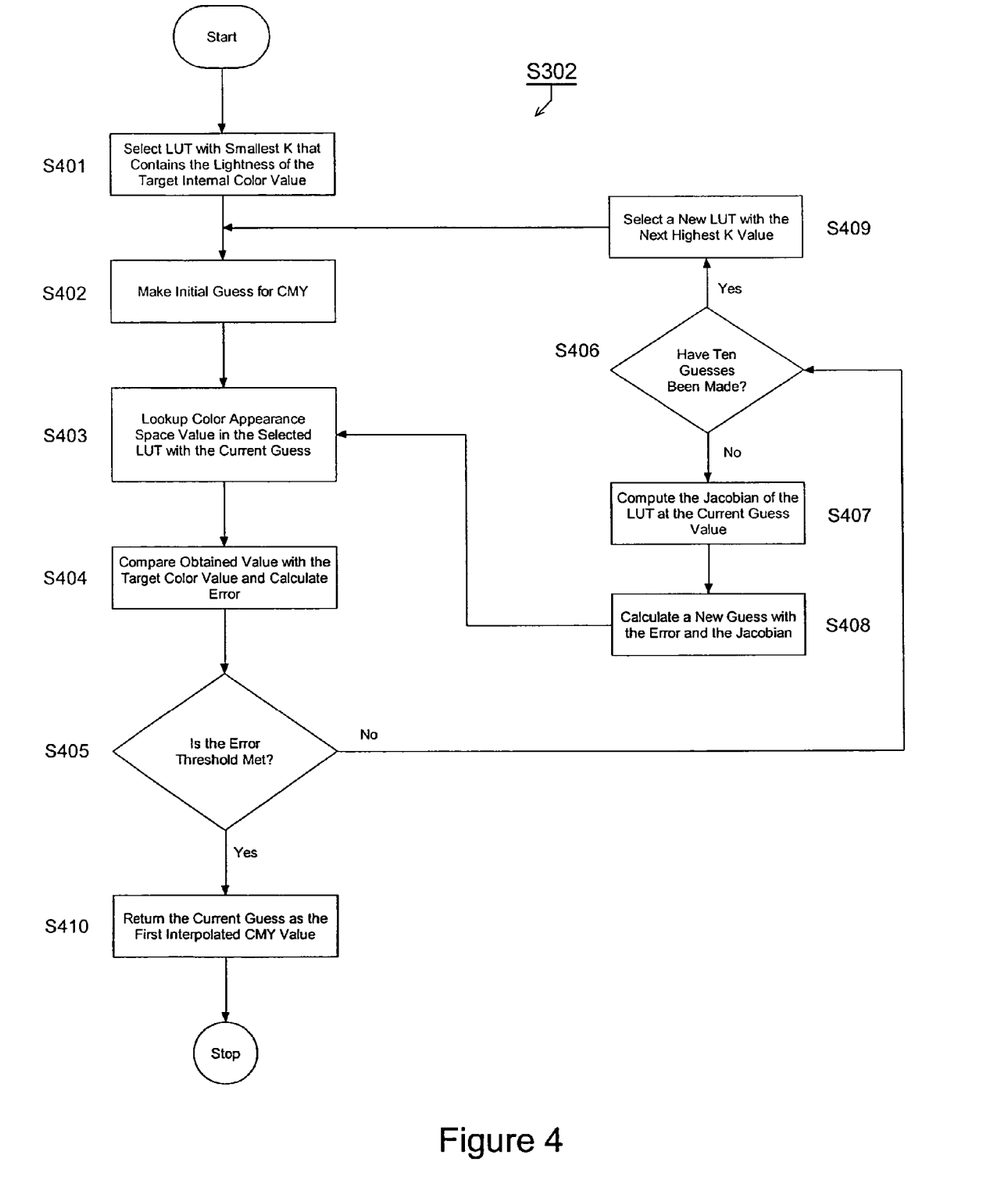
FIG. 4 is a flowchart depicting a process for interpolating a CMY value for use in a relative purity calculation.

Next, in S302, one of the plural LUTs is selected based on which of the LUTs contains the lowest K value that contains the target internal color value, and a first CMY values is interpolated from the selected LUT. FIG. 4 depicts this process in more detail. First, in S401, the process selects the LUT with the smallest K for which the lightness of the target color value falls between the minimum and maximum lightness values stored in the LUT. Next, in S402, an initial guess for CMY is made. For example, the initial guess for CMY may be (0.3, 0.3, 0.3) where C, M, and Y range from 0.0 to 1.0. This corresponds to CMY percentages of 30% for each channel.

In S403, the CMY guess (gC, gM,gY) is applied to the selected LUT to obtain the corresponding color appearance space value. For example, if the color appearance space, and therefore the target color value, is in Lab format, the LUT would be a CMY to Lab LUT. Similarly, if the color appearance space is in a Jab format, the LUT would be a CMY to Jab LUT. For a Lab color appearance space, the CMY guess will correspond to a Lab guess value (gL, ga, gb) in the selected LUT. The obtained Lab guess value is then compared to the target color value (tL, ta, tb) in S404, and the error is calculated and stored. The error is defined as the Euclidean distance between the Lab guess value and the target color value In S405, the calculated error is compared to a predetermined error threshold. In a preferred embodiment, the error threshold is equal to 0.001. If the calculated error is less than the predetermined error threshold, the interpolation is considered to be accurate and the process proceeds to S410. Note that the square of the error and the square of the threshold may be used for this calculation. This eliminates the need to compute a square root, thereby improving speed without sacrificing accuracy. In S410, the current guess for CMY is supplied to S303 in FIG. 3, as the first interpolated CMY value.

However, if the calculated error is greater than the predetermined error threshold when compared in S405, the process proceeds from S405 to S406. In S406, it is determined if ten guesses have already been made. Note that ten guesses is a preferred number for the iteration. Larger or smaller values can be used, provided that reasonable convergence is achieved. If ten guess have not yet been made, the process proceeds to S407. In S407, the Jacobian (j), or three-dimensional derivative, of the LUT is calculated at the point of the current CMY guess. In S408, the calculated Jacobian and error are used to calculate a new CMY guess.

The new CMY guess is calculated by first computing a Newtonian step delta (d) according to the following equation:

$$(d)=(tL-gL, ta-ga, tb-gb)$$

Next, a Newtonian step is calculated by solving the following equation for x, where j is the calculated Jacobian.

$$j \cdot x = (d)$$

Next, the new CMY guess is computed by adding x to the previous guess. The process then returns to S403, and the new CMY guess is applied to the currently selected LUT.

If, on the other hand, ten guesses (i.e. iterations) have already been made without meeting the predetermined error threshold, the process proceeds from S406 to S409. At this point it is determined that, even though the target color value could have possibly been contained in the selected LUT, a CMY value could not be found that maps to the target color value with the desired accuracy. Therefore, in S409, a new LUT with the next higher K value as compared to the currently selected LUT is selected. For instance, if in S403 the K=0 LUT was used, step S409 would now select the K=5 LUT. The process then returns to step S402 in order to perform an interpolation on the newly selected LUT.

This process continues until the error threshold is met and the first interpolated CMY value is provided in S410. If the interpolation process operates on all of the LUTs without obtaining a guess CMY value within the error threshold, the process supplies the CMY guess that returned the smallest error as the first interpolated CMY value.

Returning to FIG. 3, in S303, the relative purity of the first interpolated CMY value determined in S302 is determined. Relative purity (RP) is defined as:

$$RP = \frac{\text{Highest Value of } C, M, \text{ or } Y - \text{Lowest Value of } C, M, \text{ or } Y}{\text{Highest Value of } C, M, \text{ or } Y}$$

For example, for CMY=(0.30, 0.13, 0.25), the largest value, C, is 0.30 and the smallest value, M, is 0.13. Hence, relative purity, RP, is (0.30–0.13)/0.30=0.567.

In S304, a black generation function, defined below, is applied to the relative purity of the first interpolated CMY value to obtain a black generation value. The black generation function can be any function that is dependent on relative purity, for example, a linear function. In this embodiment, the black generation function is defined as:

For $RP > 0.8$, BlackGenerationValue=0

For $RP \leq 0.8$, BlackGenerationValue=$(1-RP)^{gamma}$ where gamma=3. The value 0.8 represents a predetermined black generation threshold that may have different values for different CMYK output devices. In addition, gamma may also be varied for different CMYK output devices. For instance, a larger gamma will generally produce colors with lower amounts of black ink for a specific level of color purity.

The values of gamma and black generation threshold can be changed internally by, for example, modifying computer code that calculates black generation value. The values can also be changed externally by, for example, using an external device to update the computer or printer utilizing the present invention's color management system. Moreover, the black generation function can be similarly changed by updating the equation used to calculate black generation value.

In S305, the black generation value is used to select which of the multiple LUTs to use to interpolate a final CMY value. The black generation value represents the percentage of K desired given the relative purity of the target internal color value. The black generation value is multiplied by 255 (the maximum value of the range of K in this embodiment) and the LUT whose K value is closest to the product is selected. Thus, the process selects the one of the plurality of lookup tables with a K value percentage that is closest to the calculated black generation value. For example, a black generation value of 0.55 corresponds to the K=140 LUT as 0.55*255=140.25.

Next, in S306, it is determined if the lightness (J in Jab, or L in CIELab) of the target color falls within the minimum and maximum lightness values of the color appearance space values stored in the black generation value-selected LUT. The range of minimum and maximum lightness values of the color appearance space values stored each LUT is defined as the LUT's lightness range. If the lightness of the target color falls within the lightness range of the black generation value-selected LUT, the process proceeds to S310 and the black generation value-selected LUT is used for the interpolation process.

If the lightness of the target color does not fall within the current LUT's lightness range, then it is determined if the lightness of the target color is greater than the lightness range, as in S307. If the lightness of the target color is greater than the current LUT's lightness range, then a new LUT whose K value is one step less than the current LUT is selected, as in S308. In other words, if the target color is lighter than the lightest color appearance space value stored in the selected LUT, then select a new LUT corresponding to less black ink (a lower K value). Next, the process returns to S306 and the target color's lightness is tested against the new LUT's lightness range.

In S307, if the lightness of the target color is less than the current LUT's lightness range, then a new LUT whose K value is one step greater (more black ink) than the current LUT is selected, as in S308, and the target color's lightness is tested against the new LUT's lightness range, as in S306.

Upon finding a LUT whose lightness range encompasses the lightness of the target color, Newton's method and Jacobians are applied to interpolate a final CMY value within the LUT, as in S310.

Figure 5:
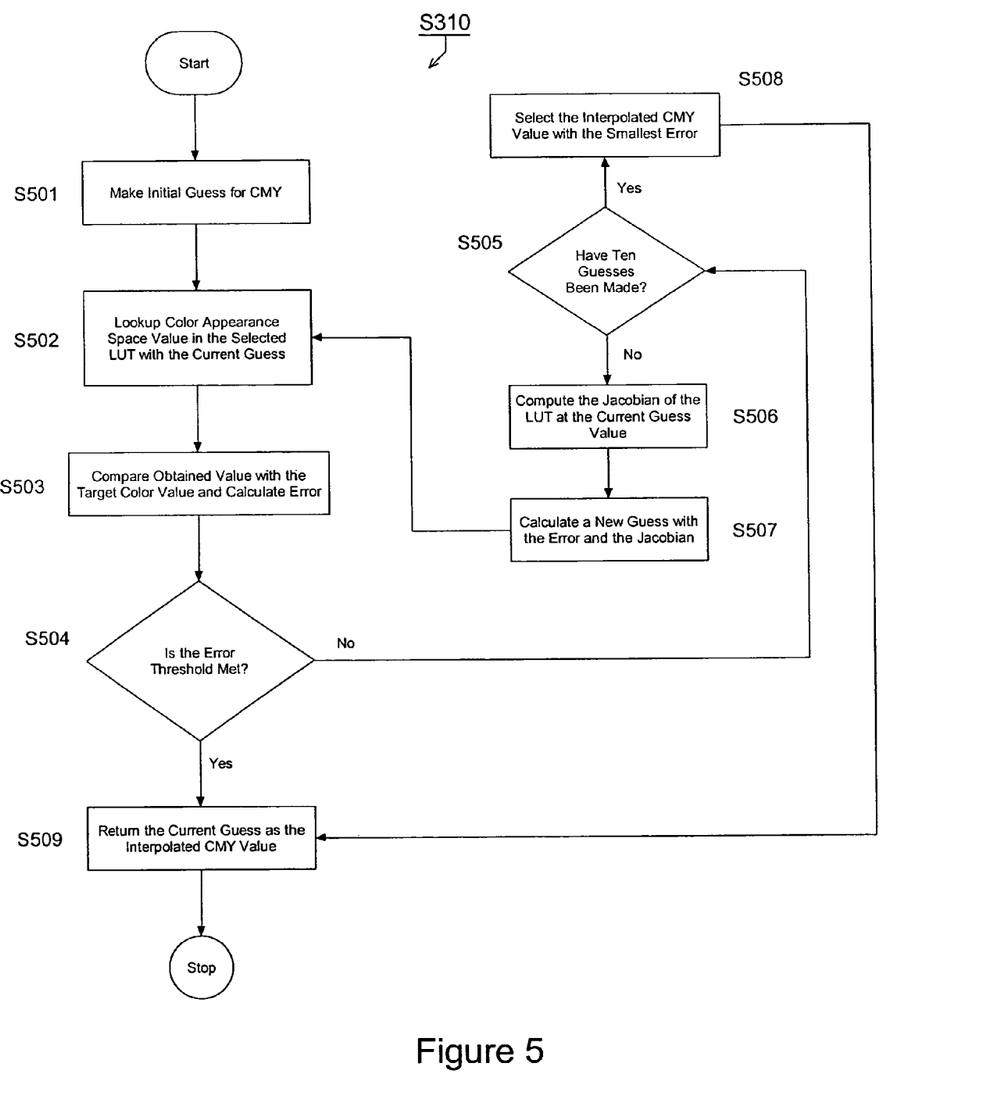
FIG. 5 is a flowchart depicting a process for interpolating a CMYK value from a selected lookup table.

FIG. 5 depicts the process by which a final CMY value is interpolated from the selected LUT using Newton's method. First, in S501, an initial guess for CMY is made. For example, the initial guess for CMY is (0.3, 0.3, 0.3) where C, M, and Y range from 0.0 to 1.0. This corresponds to CMY percentages of 30% for each channel.

In S502, the CMY guess is applied to the selected LUT to obtain the corresponding color appearance space value. Next, the obtained color appearance space value is then compared to the target color value. In S503, the error is calculated and stored. The error is defined as the Euclidean distance between the obtained color appearance space value and the target color value In S504, the calculated error is compared to a predetermined error threshold. In a preferred embodiment, the predetermined error threshold is equal to 0.001. If the calculated error is less than the predetermined error threshold, the interpolation is considered to be accurate and the process proceeds to S509. In S509, the current guess for CMY is supplied to S311 in FIG. 3, as the interpolated CMY value.

However, if the calculated error is greater than the predetermined error threshold when compared in S504, the process proceeds from S504 to S505. In S505, it is determined whether ten guesses have already been made. Note that ten guesses is a preferred number for the iteration. Larger or smaller values can be used, provided that convergence is achieved. If ten guess have not yet been made, the process proceeds to S506. In S506, the Jacobian (j), or three-dimensional derivative, of the LUT is calculated at the point of the current CMY guess. In S507, the calculated Jacobian and error are used to calculate a new guess using Newton's method as discussed above at S407.

If, on the other hand, ten guesses (i.e. iterations) have already been made without meeting the predetermined error threshold, the process proceeds from S505 to S508. At this point, the CMY value with the smallest error is selected from the previous ten guesses. In S509, the current guess for CMY is supplied to S311 in FIG. 3, as the interpolated CMY value.

Next, in S311, the interpolated CMY value from S509 and the K value of the currently selected LUT are supplied as the CMYK value corresponding to the target color value. CMM 100 (FIG. 1) outputs the CMYK value for rendering by CMYK device 104, such as by printing.

The interpolated CMY value can calculated in other ways as well. For example, a range of CMY values may be interpolated from LUTs with K values near the K value of the selected LUT in S310. This range of interpolated CMY values, including the CMY value interpolated from the selected LUT in S310, may be averaged to produce a final interpolated CMY value.

The above process of converting color appearance space values to CMYK values with control on the K channel is described in the context of color management system 100. In addition, the present invention can be used to convert color appearance space values to CMYK values as process steps in a printer driver, or in the printer itself.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A color management method for converting internal color values to CMYK color values, wherein the method utilizes a color transform that maps CMYK color values to internal color values, the color transform being ranged as a plurality of three-dimensional CMY space to internal color space lookup tables, each associated with a different K value, the method comprising the steps of:
    receiving a target internal color value;
    calculating a relative purity of the target internal color value in CMY space;
    calculating a black generation value from the relative purity;
    selecting one of the plurality of CMY lookup tables based on the black generation value; and
    providing a CMYK value based on interpolation from the selected lookup table,
    wherein relative purity of the target internal color value is calculated based on a difference between a largest value and a smallest value of C, M and Y values for the target internal color value, relative to the largest value of the C, M and Y values for the target internal color value.

2. The color management method according to claim 1, wherein the relative purity of the target internal color value is calculated by subtracting the smallest value of C, M or Y corresponding to the target internal color value from the largest value of C, M, or Y corresponding to the target internal color value and dividing that total by the largest value of C, M, or Y corresponding to the target internal color value.

3. The color management method according to claim 2, wherein the relative purity of the target internal color value is calculated from a corresponding CMY value from one of the plurality of lookup tables that contains the target internal color value.

4. The color management method according to claim 2, wherein the relative purity of the target internal color value is calculated from a corresponding CMY value from the one of the plurality of lookup tables with the smallest K value that contains the target internal color value.

5. The color management method according to claim 1, further including the step of updating the black generation value equation from an external device.

6. The color management method according to claim 4, wherein the black generation value is determined to be 0 if the calculated relative purity is greater than a predetermined black generation threshold, and wherein the black generation value is determined by the equation if the calculated relative purity is less than the predetermined black generation threshold.

7. The color management method according to claim 6, wherein the predetermined black generation threshold is 0.8 and gamma is 3.0.

8. The color management method according to claim 6, wherein the selection step selects the one of the plurality of lookup tables with a K value percentage that is closest to the calculated black generation value.

9. The color management method according to claim 1, wherein the providing step includes the steps of:
   interpolating a CMY value from the selected lookup table and the target internal color value;
   computing an error in the interpolated CMY value;
   comparing the computed error to a predetermined error threshold;
   providing the interpolated CMY value and the K value associated with the selected CMY lookup table, in the case that the predetermined error threshold is met; and
   selecting a new CMY lookup table, in the case that the predetermined error threshold is not met, and interpolating a new CMY value from the newly selected lookup table and the target internal color value.

10. The color management method according to claim 9, wherein the interpolation is achieved using Newton's method and Jacobians.

11. The method according to claim 9, wherein the target internal color value is in a CIELab format.

12. The method according to claim 9, wherein the target internal color value is in a CIECAM format.

13. The method according to claim 9, wherein the target internal color value is in a CIELuv format.

14. An apparatus for converting internal color values to CMYK color values, wherein the apparatus utilizes a color transform that maps CMYK color values to internal color values, the color transform being arranged as a plurality of three-dimensional CMY space to internal color space lookup tables, each associated with a different K value, the apparatus comprising:
   a program memory for storing process steps executable to perform a method according to any one of claims 1 to 13; and
   a processor for executing the process steps stored in said program memory.

15. Computer-executable process steps stored on a computer readable medium, said computer-executable process steps for converting internal color values to CMYK color values, wherein the computer-executable process steps utilize a color transform that maps CMYK color values to internal color values, the color transform being arranged as a plurality of three-dimensional CMY space to internal color space lookup tables, each associated with a different K value, said computer-executable process steps comprising process steps executable to perform a method according to any one of claims 1 to 13.

16. A computer-readable medium which stores computer-executable process steps, the computer-executable process steps for converting internal color values to CMYK color values, wherein the computer-executable process steps utilize a color transform that maps CMYK color values to internal color values, the color transform being arranged as a plurality of three-dimensional CMY space to internal color space lookup tables, each associated with a different K value, said computer-executable process steps comprising process steps executable to perform a method according to any one of claims 1 to 13.

* * * * *